UNITED STATES PATENT OFFICE.

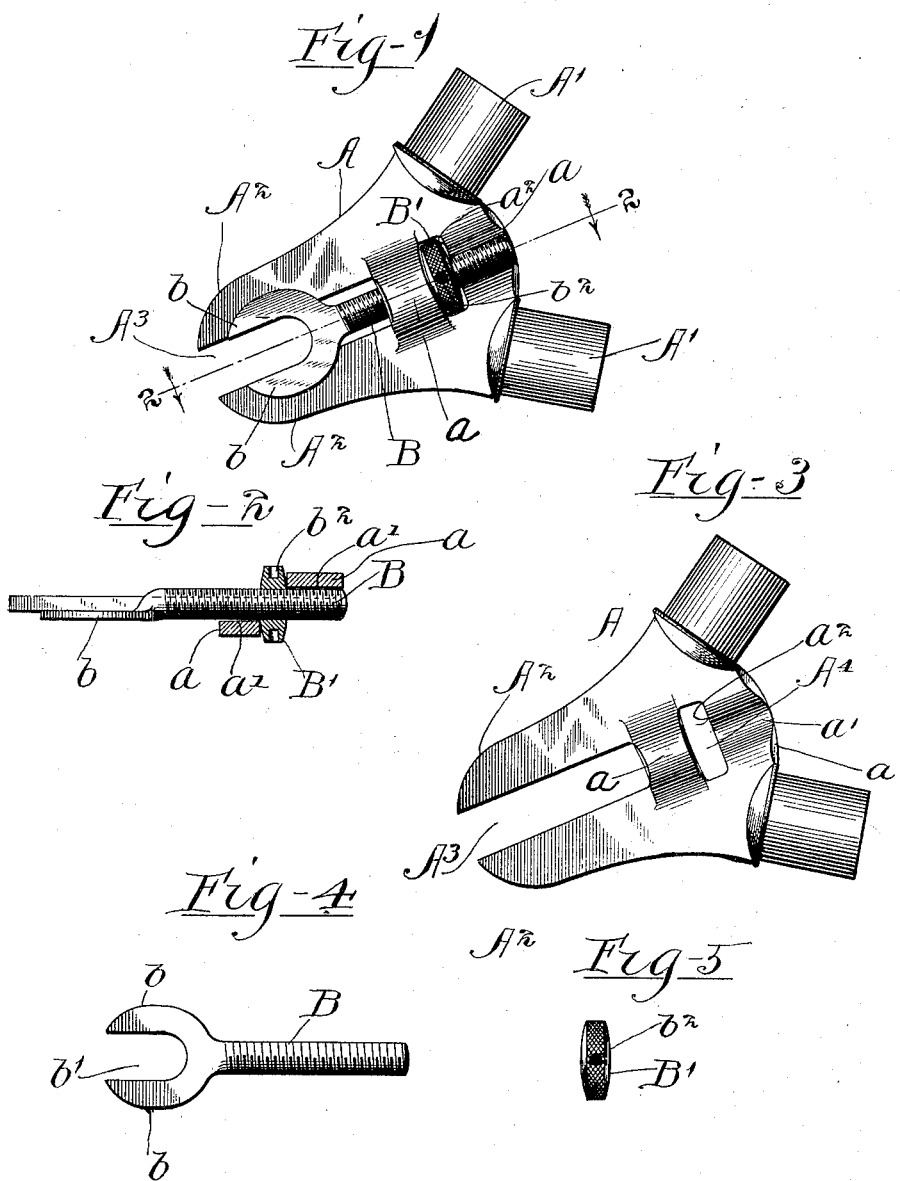

MYRON F. TAINTOR, OF NORTHAMPTON, MASSACHUSETTS, ASSIGNOR TO THE GEO. L. THOMPSON MANUFACTURING COMPANY, OF CHICAGO, ILLINOIS.

CHAIN ADJUSTMENT.

SPECIFICATION forming part of Letters Patent No. 639,460, dated December 19, 1899.

Application filed February 28, 1898. Serial No. 671,904. (No model.)

*To all whom it may concern:*

Be it known that I, MYRON F. TAINTOR, of Northampton, in the county of Hampshire and State of Massachusetts, have invented certain new and useful Improvements in Rear-Fork End and Chain-Adjusting Devices for Bicycles; and I do hereby declare that the following is a full, clear, and exact description thereof, reference being had to the accompanying drawings, and to the letters of reference marked thereon, which form a part of this specification.

This invention relates to improvements in chain-adjusting devices for bicycles of that class which are located upon the fitting or junction-plate, by which the rear oblique and horizontal members of the bicycle-frame are joined.

A fitting or junction-plate constructed in accordance with my invention will be made as follows: The said fitting, which will preferably be formed by means of suitable swaging-dies from a single piece of sheet metal, is provided in its rear part with a longitudinal slot to receive the rear-wheel axle of the bicycle and at its front end with divergent projections to which the rear-fork members are attached. Said junction-plate is provided at the rear of said slot with a guide for an adjusting-bolt and with a transverse slot adapted to receive a screw-threaded nut which engages the screw-threaded portion of the adjusting-bolt and by means of which said bolt is moved toward and from the axle. As a still further improvement said guide for the adjusting-bolt is formed by two half sockets or grooves formed on opposite sides of the fitting at the front and rear of the transverse slot in which the adjusting-nut is located.

The invention will be more readily understood by reference to the accompanying drawings, in which—

Figure 1 illustrates in side elevation a fitting or junction-plate and chain adjustment constructed in accordance with my invention. Fig. 2 is a longitudinal section taken on line 2 2 of Fig. 1. Fig. 3 illustrates the junction-plate with the adjusting-bolt removed therefrom. Figs. 4 and 5 are details of the adjusting bolt and nut removed from the fitting.

As shown in said drawings, A designates as a whole a fitting or junction-plate which is adapted to be secured to the rear oblique and horizontal fork members of a bicycle-frame and by means of which said members are connected rigidly together, and B designates an adjusting screw or bolt which has screw-threaded engagement with a nut engaging with the junction-plate and is adapted to engage at its rear end the axle of the rear wheel. Said junction-plate consists generally of a flat metal plate A, which is provided in the front end thereof with forwardly-divergent projections, upon which are secured attaching-thimbles A' A', which are adapted to be inserted into the tubular lower ends of the rear-fork members and rigidly secured therein in any suitable manner. Said junction-plate is forked at its rear end or provided with two rearwardly-directed laterally-separated arms or prongs $A^2$ $A^2$, between which is formed an elongated rearwardly-opening slot or notch $A^3$, adapted for the reception of the rear-wheel axle. At the base of the slot $A^3$ the plate is shaped to provide a guide for the inner or screw-threaded end of the adjusting-bolt B, the opposite end of which extends centrally between the arms $A^2$ and engages the axle in the slot. Said plate A is provided forward of the slot $A^3$ with a transverse slot $A^4$, which is adapted to receive a nut B', which engages the screw portion of the bolt to move the same longitudinally of the junction-plate to change the position of the axle therein. The guide for the bolt is formed by swaging or bending outwardly in opposite directions the connecting-strips or transverse connecting-bars $a$ $a$, of metal, at the front and rear of the transverse slot $A^4$ and in line with the slot $A^3$, thereby forming upon the opposite sides of the plate half-sockets or guide-grooves $a'$ $a'$, which engage opposite sides of the adjusting-bolt. The inner edge $a^2$ of the forward cross-piece $a$ forms a shoulder against which the adjacent face of the nut B' bears and which receives the thrust through said nut of the bolt when the same is moved against the axle to tighten the driving-chain. The swaged portions $a$ $a$ will be bent an equal distance on each side of the central line of the plate A, so that the axis of the adjusting-bolt when resting therein will extend centrally of the arms A², and said bolt will project at its outer surfaces an equal distance on each side of said plate.

The adjusting-bolt B is provided on the end thereof which engages the axle with laterally-separated arms b b, forming between the same a rearwardly-opening notch or slot b' for the reception of the axle, said slot being made of the same width as the slot A² of the junction-plate. Said arms b are flattened and engage the outer faces of the arms A², the bolt for this purpose being offset to bring the inner faces of the arms b into the plane of the outer face of the arms A². The guide-groove a' at the rear of the slot A⁴ is formed in the inner face of the plate, while the groove a' of the slot is formed in the outer face of the plate, so that the arms b of the bolt B, which rest in contact with the outer face of the plate, form, in connection with the opposite guide-grooves a', guides by which the bolt is maintained in position upon the fitting when the axle is removed therefrom.

The adjusting-nut B' is preferably provided in its periphery with one or more apertures b², by which said nut may be engaged by a suitable tool when it is desired to adjust the tension of the chain. Said nut will also desirably be provided with a knurled edge or periphery, by which it may be readily turned by the fingers when inserting the bolt into its socket. When it is desired to insert said bolt into the socket, the nut will be placed in the transverse slot A⁴, and the screw-threaded end of the bolt will be placed in contact with the screw-threads of the nut on the side thereof adjacent to the rear cross-bar a' and the nut turned in the direction to screw the same upon the bolt, which will act to draw said bolt endwise into the guide-grooves.

The transverse portions a a of the plate when said plate is made of sheet metal will be formed by suitable cutting and swaging dies, said dies being constructed to cut the plate to the proper shape and to form the longitudinal and transverse slots A³ A⁴ therein and to thereafter swage the cross-pieces a a. When such operations are completed, said plate will be ready for use with the exception of placing the attaching-thimbles A' thereon and inserting the adjustable bolt therein.

Junction-plates have heretofore been constructed which are provided with an integral port or swaged portion, which latter is screw-threaded and adapted to receive a set screw or bolt, which passes therethrough and engages at its inner end the axle, whereby said axle may be moved with relation to the junction-plate when said screw is turned. A junction-plate made in accordance with my invention is preferable to such prior construction by reason of the fact that it is entirely free from screw-threaded parts, the screw-threaded portions on the adjusting parts of the device being formed on parts which are detachable from the junction-plate or upon the bolt B and nut B'. Said bolt B and nut B', while being made detachable from the junction-plate, are, when inserted in place therein, by reason of the special construction herein shown and described, as effective in producing tension upon the driving-chain as if made a part of the junction-plate itself.

An objection to the use of the construction in which the screw-threads are formed in the junction-plate is that if said screw-threads are for any reason destroyed it will be necessary to rethread the same at a considerable expense of time and labor. If, on the other hand, the screw-threads of the corresponding part of my device be impaired—to wit, the threads in the nut—it will only be necessary to provide a new nut at a trifling expense.

A further objection arising in the practical use of the prior construction in which the adjustment is effected by means of a set screw or bolt which engages a screw-threaded part of the junction-plate is that the constant jarring of the machine tends to loosen said screw or bolt and to thereby loosen the tension of the chain. The construction herein illustrated and described obviates this objection by reason of the fact that the rear forked end of the adjusting-bolt B engages the outer face of the junction-plate and is clamped rigidly between the same and the clamping-nut on the axle. With such construction it will obviously be impossible after the adjusting-bolt has once been set to change the same without releasing the clamping-nut upon the axle. Said bolt cannot, therefore, be accidentally moved endwise in its socket and the adjustment of the chain affected. Moreover, said locking of the lower end of the adjusting-nut against the outer face of the junction-plate provides a more rigid construction in the parts engaged by the rear-wheel axle and acts to reinforce or strengthen said junction-plate at this point.

While the plate A is herein shown as made from a single piece of sheet metal, yet it will be obvious that so far as the general features of the invention are concerned it may be otherwise formed, as by casting or drop-forging, and I do not wish to be restricted to any particular manner of making the same. However, in view of the simplicity of the construction and of the economy in the manufacture thereof said junction-plate, constructed of sheet metal in the manner herein set forth, is herein claimed as a separate improvement.

I claim as my invention—

1. The combination of a junction-plate for the rear-fork members of a bicycle-frame, a screw-threaded adjusting-bolt, and a nut, said plate being provided with a slot to receive an axle, with a transverse slot to receive the nut, and with two opposite guide-grooves, one in front and one in rear of said transverse slot, to receive the bolt, of which the groove at the rear of the transverse slot is formed in the inner face of the plate and that in front of the transverse slot is formed in the outer face of the plate, said bolt having laterally-separated arms on its rear end which engage the outer face of the plate on each side of the axle-slot and are adapted to be clamped between the same and the axle-clamping nut and providing a rearwardly-opening notch to receive the axle.

2. The combination of a junction-plate for the rear-fork members of a bicycle-frame, a screw-threaded adjusting-bolt and a nut, said plate being provided with a slot to receive an axle, a transverse slot to receive the nut and with guide-grooves to receive the bolt which grooves are formed by bending or swaging the metal of the plate at the front and rear of the transverse slot toward the opposite sides of the plate, and said bolt being provided at its rear end with laterally-separated arms which engage the outer face of the plate and between which is formed a rearwardly-opening notch adapted to receive the axle.

In testimony that I claim the foregoing as my invention I affix my signature, in presence of two witnesses, this 31st day of January, A. D. 1898.

MYRON F. TAINTOR.

Witnesses:
JOHN T. KEATING,
WILLIAM H. FEIKER.